United States Patent

Hagerty

[15] 3,680,353
[45] Aug. 1, 1972

[54] APPARATUS FOR AUTOMOBILE DAMAGE CORRECTION

[72] Inventor: William Kenneth Hagerty, 605 E. Norwood Place, Alhambra, Calif. 91801

[22] Filed: April 15, 1970

[21] Appl. No.: 28,670

[52] U.S. Cl. ..........72/420, 269/17, 72/705, 72/447
[51] Int. Cl. ........B21d 3/12, B21d 11/14, B21d 1/14
[58] Field of Search........72/705, 295, 305, 446, 447, 72/420, 419; 269/17

[56] References Cited

UNITED STATES PATENTS

| | | | |
|---|---|---|---|
| 1,785,923 | 12/1930 | Wade | 72/392 |
| 2,370,019 | 2/1945 | Dougherty | 269/17 X |
| 2,792,046 | 5/1957 | Fagan | 72/705 X |
| 3,206,966 | 9/1965 | Fagan et al. | 72/705 X |

*Primary Examiner*—Charles W. Lanham
*Assistant Examiner*—E. M. Combs
*Attorney*—Jackson & Jones

[57] ABSTRACT

An apparatus for aligning automobile frames and bodies is disclosed having a plurality of anchors attached to the floor and positioned peripherally about the damaged automobile. Force applying and force reaction means are adapted to engage any of the anchors and are operatively applicable to strategic locations on the frame of the automobile from various angular positions to apply corrective and reactive tensile forces thereon to straighten the damaged portion of the automobile. The automobile is supported by movable floor supported bases to enable the automobile to freely align itself properly with respect to the corrective and reactive forces.

10 Claims, 8 Drawing Figures

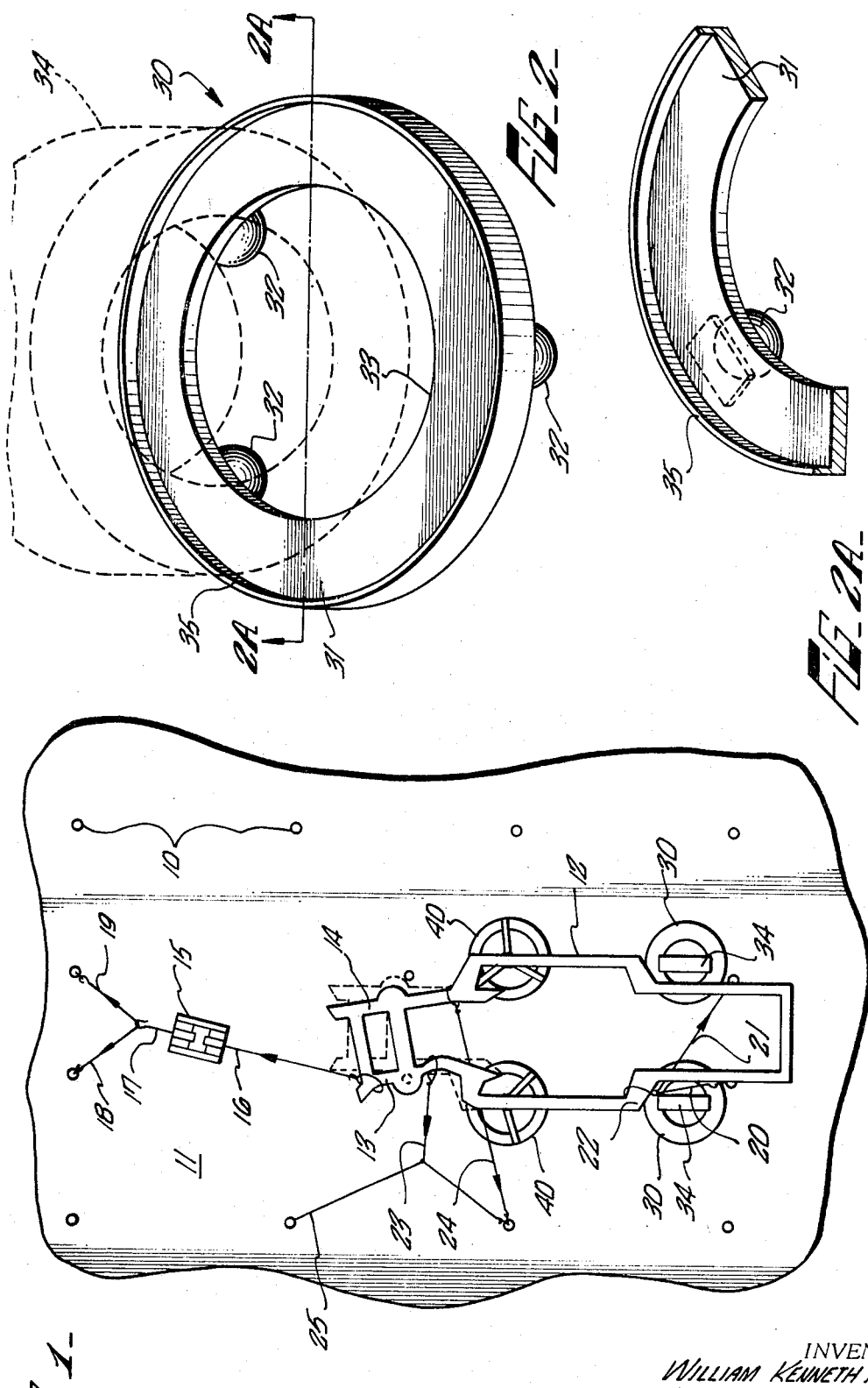

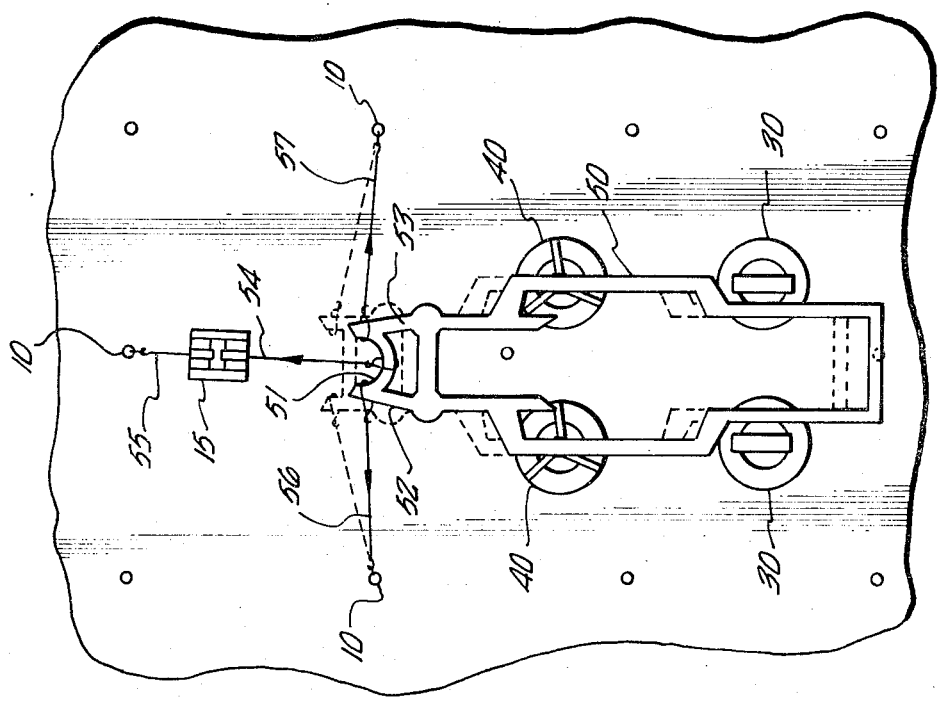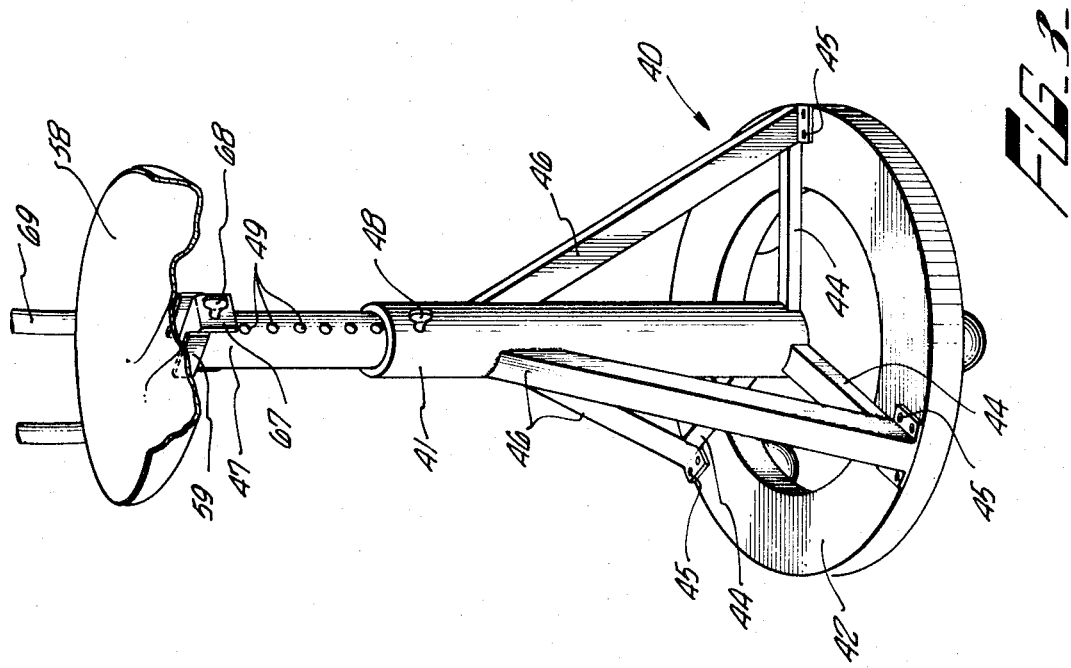

APPARATUS FOR AUTOMOBILE DAMAGE CORRECTION

BACKGROUND OF THE INVENTION

1. Field of the Invention

The present invention relates to an apparatus for aligning damaged automobile bodies or frames.

2. Description of the Prior Art

The field of straightening damaged automobile bodies and frames has been quite an exact and extensive art in which numerous patents have been granted and in which several manufacturers are supplying machines to permit operators to practice this art on a commercial basis. Probably the best known machines are the popular heavy duty large scale models which many frame shops purchase and permanently install on their premises. However, since these large standard frame machines are initially expensive, their commercial utilization is severely restricted mainly to the large shops. Another disadvantage of these machines is, of course, their size and bulkiness, which again limits their use only to the large shops. Furthermore, being permanent fixtures, these machines do not permit unrestricted use of the floor spaces when the machines are not in use.

In order to be economically and practically feasible for the average automobile repair shop, small economical portable frame machines have been provided. However, these machines suffer from various shortcomings which hamper their widespread acceptance and use. In such prior devices a longitudinal beam is usually positioned under the damaged automobile in any horizontal direction. A force applying system is usually located adjacent the one end of the beam with a force reaction means located at the other end thereof. A serious shortcoming with such an apparatus is the manner in which it is aligned with the damaged portion of the automobile. As a general rule, the apparatus is positioned under the automobile with the entire automobile mounted thereon and firmly attached thereto. In this secured position, the automobile is unable to move and continually realign itself with the corrective and reactive forces as the forces are acting on the automobile. As a result, undesirable moments acting on the frame of the automobile are created, which cause undue stresses and strains on the structure and on the equipment itself. These stresses and strains due to such misalignment can be damaging to the automobile and are the main reason for equipment failure.

Another disadvantage of such an apparatus is that it is limited as to the direction the corrective and reactive forces can be applied. As a general rule, these forces are usually directed longitudinally of the beam, making it quite difficult to align the apparatus with respect to the damaged portion of the automobile in order to achieve the most beneficial moment are position. This shortcoming is accentuated in situations where the entire automobile frame is bent into a bow. In these situations, the beam is usually placed at a position transverse to the bow with the corrective and reactive forces acting in that transverse direction. It has been found that tensile forces are also required in the longitudinal direction of the frame member to enable it to become elongated as it is being straightened. However, this requirement of applying tensile forces in all four directions can not be accomplished by the above-mentioned apparatus. As a result, other force applying means are necessary to elongate the frame as it is being straightened. If such means are not used, the straightened frame will not return to its original elongated condition, and as a result, body members such as doors can not properly be fitted back onto the frame as they were originally.

Another serious limitation of this type of apparatus is that since the beam and the support structure are located under the automobile, it is quite difficult to gain access to the underside of the automobile as is often desired in repair operations.

SUMMARY OF THE INVENTION

In accordance with the present invention, an apparatus for aligning automobile frames and bodies is provided that obviates the above-mentioned shortcomings in the prior system. The apparatus includes a plurality of anchors attached to the floor and positioned peripherally about the damaged automobile. Force reaction members are provided to act as a resistance against the applied forces directed on the automobile. Each reaction member comprises a length of chain having one end engagable to any of the anchors and the other end operatively applicable to the frame or damaged part of the automobile. Force applying means are also included in the apparatus and comprise a force applicator connected to a length of chain which is also operatively connected to the frame or damaged part of the automobile. The force applicator is also secured to one of the anchors and functions to exert a pulling force on the chain. The entire automobile is supported by movable floor support bases to enable the automobile to freely align itself properly with respect to the reactive and corrective forces acting thereon.

The main advantage of the apparatus in accordance with the present invention is its ability to permit the automobile to align properly with the corrective and reactive forces as the damaged portion of the automobile is being straightened. This is done by supporting the automobile with wheel mounted support bases which enable the automobile to be freely movable as the corrective and reactive forces are applied. In such a manner, undesirable stresses and strains acting on the automobile frame and the chains are avoided. In one preferred embodiment the movable floor bases include circular plates mounted on castors. The circular plates have an opening or other tire-supporting means in the center thereof.

Another advantage of such an apparatus is that the direction of the corrective and reactive forces can be applied from any angle desired to produce more efficient bending forces.

Furthermore, in such an apparatus, no large horizontal or vertical beams are required to support the car, thereby enabling easy access to the underside of the automobile. Another advantage of having the reactive and corrective forces applied from any direction occurs in a bowed frame situation. In this situation the reactive forces can be applied at the ends of the bow to lengthen the frame as it is being straightened to return the frame to its original elongated position.

Another important feature of the apparatus is that since the anchors are located within the floor and the chains and force applicators are movable, unrestricted use of the floor space for other work is available when the apparatus is not in use.

Thus a primary object of the invention is fulfilled by providing a method and apparatus for straightening automobile frames or bodies that is economical in construction, relatively simple in use and efficient in operation.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 2 is a perspective view of a movable floor supported base for supporting the automobile;

FIG. 2A is a cross-sectional view taken along the lines indicated in FIG. 2;

FIG. 3 is a perspective view of a second embodiment of the floor supported base;

FIG. 4 is a plan view of a frame bent at its forward end with the present invention applied for correction thereof;

FIG. 7 is a plan view of a frame longitudinally bent with the present invention operatively connected at the ends thereof.

DESCRIPTION OF THE PREFERRED EMBODIMENT

Figure 1:
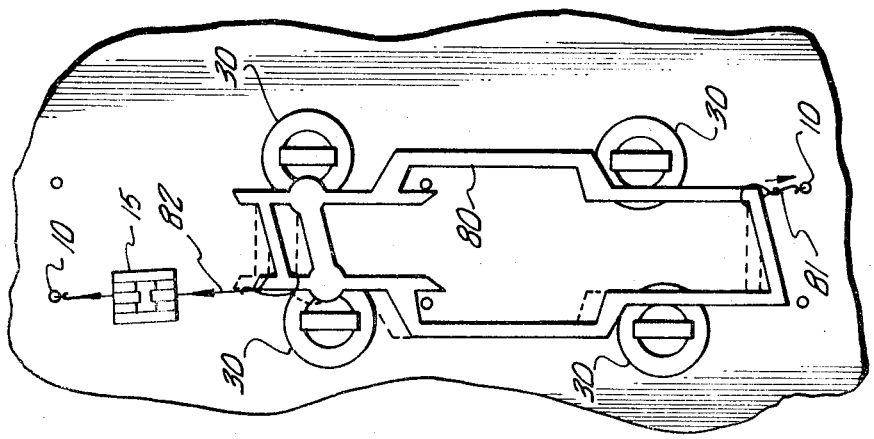
FIG. 1 is a plan view of the present invention attached to an automobile for the correction of bent component parts.

Referring now to the drawings, FIG. 1 shows a plurality of anchors 10 fixedly attached to a floor 11 in a grid formation. The outline of the grid is rectangular in form, with the anchors 10 spaced in four rows with the outer rows having four anchors therein and the middle rows having three. Although such a configuration is illustrated, various configurations having different numbers of anchors can also be utilized. The anchors 10 are usually submerged in the floor 11 and can be covered to permit unrestricted use of the floor 11 when the apparatus is not being utilized.

An automobile frame 12 is shown in which major damage has occurred by a front end collision in which the front wheel control arms 13 and 14 have been transversely bent with a resulting deformation of several frame parts. For illustrative purposes, the automobile frame 12 is shown schematically with the rest of the automobile body deleted for the sake of clarity. The present invention operates in the most efficient manner when it applies corrective forces in a reverse direction from the collision forces which caused the damage to the frame.

The present apparatus is positioned as illustrated to include a force applying means which is located forwardly of the frame 12 and consists of a force applicator 15 operatively connected to the front section of the frame 12 by means of a chain 16 which is looped around the forward section of the frame 12. The forward end of the force applicator 15 includes a connecting chain 17 which is also secured to a pair of anchors 10 by means of a pair of chains 18 and 19. The force applicator 15 can be of any conventional applicator post design and is usually powered by a hydraulic jack which exerts a pulling force on the chain 16 to apply a tensile force to the frame 12. Force reaction means are provided to resist the tensile forces applied to the frame 12 by the force applying means. Such means includes a pair of chains 20 and 21 each having one end engaging an anchor 10 with the other ends thereof converging to form a loop around the rear section of the side rail 22.

The force reaction means further includes a pair of chains 23 and 24 having one end of each being looped around portions of the control arms 13 and 14, respectively. The other end of the chain 23 is secured to a pair of anchors 10 by means of an elongated chain 25. The other end of the chain 24 also engages one of the anchors 10. The frame 12 is supported by a plurality of movable support bases 30 and 40 which can either support the frame 12 directly or support the tires 34 of the automobile. As the moving tensile pulling force is applied to the frame in the longitudinal direction of the chain 16, resistance forces are created by the chains 20, 21, 23 and 24 which act in the direction of the arrows noted thereon. The reactive forces generated by the chains 20 and 21 act to resist the longitudinal pull on the frame 12 while the reactive forces generated by the chains 23 and 24 exert transverse forces on the frame 12 about which the control arms 13 and 14 pivot as they are being straightened.

FIG. 2 shows a floor supported base 30 utilized to support the automobile. The base 30 includes a circular support plate 31 having a plurality of wheels 32 circumferentially spaced therebeneath. An opening 33 is formed at the center of the circular support plate 31 and is adapted to receive a tire 34 (shown in phantom) of the automobile. Four bases are provided to support the four tires of the automobile. Because of the weight of the automobile, the downward force exerted thereby is sufficient to maintain the tires within the opening 33 and the wheels 32 of each base 30 are peripherally spaced in such a manner to prevent the base from tipping over upon lateral moment thereof.

FIG. 3 is a modification of the floor mounted support base 40 and is utilized to support any portion of the frame or any other main body member of the automobile when it is impossible to support the tires or when it is desirable to support the automobile at some other location. Each of the support bases 40 includes a post 41 removably mounted on a support plate 42 having a plurality of wheels circumferentially mounted thereunder. The support plate 42 is identical in structure to the support plate 31 and can be used to support an automobile tire within its opening upon removal of the post 41. The post 41 is mounted on three horizontal legs 44 adapted to be secured to the support plate 42 by means of a plurality of bolts 45 or other conventional means. Three support struts 46 are also connected to the post 41 and the support plate 42 for bracing purposes. The upper portion of the post 41 includes a neck portion 47 which telescopes into the post 41 with the height of the neck portion 47 being adjustable by means of a pin 48 extending through a plurality of bores 49 located within the neck portion 47.

FIG. 2A depicts a side elevation of FIG. 2 cut along the lines 2A-2A shown in the FIG. 2. As depicted in FIG. 2A, an upstanding rib 35 is located on the upper periphery of a floor mounted support base. This upper rib 35 may be located on either support plates 31 or 42 of FIGS. 2 or 3, respectively. With rib 35 present, the post 41 mounted on its horizontal legs 44, FIG. 3, may be dropped into place on the support base and held in a secure position without using any bolts 45 or other conventional securing means.

I have found that many of the skilled artisans of the body working art desire a movable seat while performing their craft. Such a seat 58, FIG. 3, is readily placed on top of the channel member 59 by mounting the seat 58 on a downward facing channel member 67. The channels 59 and 67 are interleaved much in the manner of one cupping his palms together. A pin 68 may be passed through the top bore 49 of neck portion 47 to suitably secure seat 58 to neck portion 47 of post 41. The additional pin 48, FIG. 3, which engages telescoping post 41 which secures the second pin 48 allows the artisan to raise or lower his seat 58 for proper heighth relative to his work. The movable floor mounted support base 40 allows the skilled artisan to move his working position laterally about floor 11. A back rest 69 may be provided for seat 58 if so desired.

FIG. 4 shows an automobile frame 50 having its forward chassis bowed inwardly as commonly occurs in a head-on collision. The correcting procedure involves bowing the bent member 51 forward and straightening the control arms 52 and 53. This procedure is carried out by providing a force transmission chain 54 operatively secured to the bowed member 51 with the other end operatively connected to the force applicator 15. The force applicator 15 is secured to an anchor 10 by means of a chain 55. A pair of chains 56 and 57 are operatively connected to the control arms 52 and 53 with the outer ends of the chains 56 and 57 attached to a pair of opposing anchors 10. The entire frame 50 is supported by a plurality of floor supported bases 30 and 40 at the locations illustrated. In operation, the force applicator 15 exerts a pulling force on the bowed member 51 in the direction of arrows shown on chain 54, while the chains 56 and 57 exert tensile forces on the frame 50 in the direction of the arrows shown on the chains 56 and 57. It should be noted that the main portion of the frame 50 is permitted to move freely on the bases 40 and is able to align itself properly with the corrective and reactive forces as the forward chassis is being straightened to a position shown in broken lines. In this manner, unequal stresses and strains on the chains and the frame structure are prevented.

Figure 5:
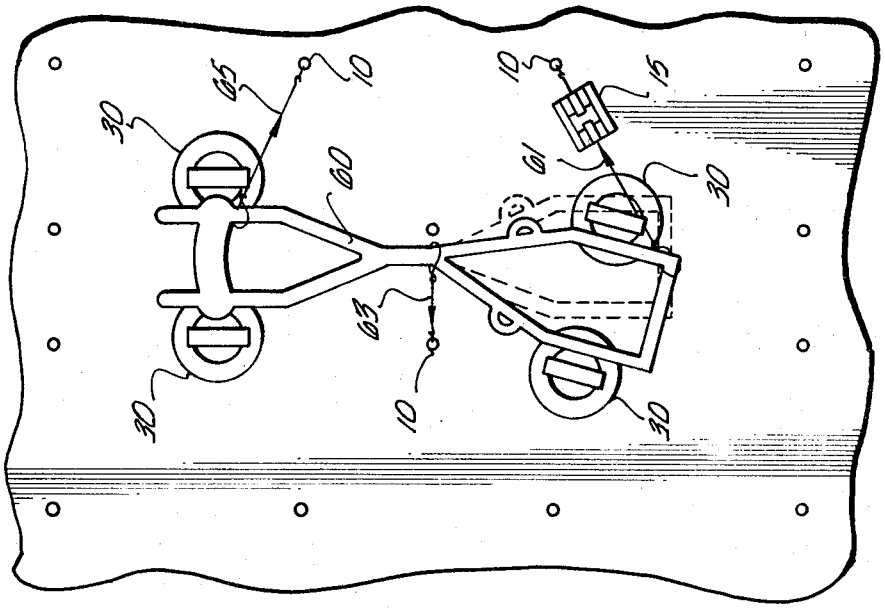
FIG. 5 is a plan view of an X frame having the rear section bent in the transverse direction with the present invention attached thereto for corrective purposes.

FIG. 5 shows an X frame 60 having its rear section bent to the one side as commonly occurs from a side collision. In the straightening procedure the frame 60 is positioned within the grid formed by the anchors 10 with its rear end secured to the force applicator 15 by means of a chain 61. The central portion of the X frame 60 is attached to an interior anchor 10 by means of the chain 63, while the forward portion of the frame 60 is connected to an anchor 10 by means of a chain 65. The entire automobile is supported by the floor supported bases 30.

In this configuration the force applicator 15 applies a pulling force on the rear section of the frame 60 in the direction of the arrows shown on chain 61, while reactive forces are exerted on the center and forward ends of the frame 60, as shown by the arrows on chains 63 and 65. The reactive forces of the chains 63 and 65 function to maintain the forward portion of the frame 60 in a secure position while the rear portion of the frame 60 is pivoted about its central portion until it reaches its original position, shown in broken lines. Again, it should be noted that the rear portion of the X frame 60 is easily movable so as not to add to any drag on the system, while the forward portion of the frame 60 is permitted to align itself with the reactive chains 63 and 65 in order not to create any undue stresses thereon.

Figure 6:
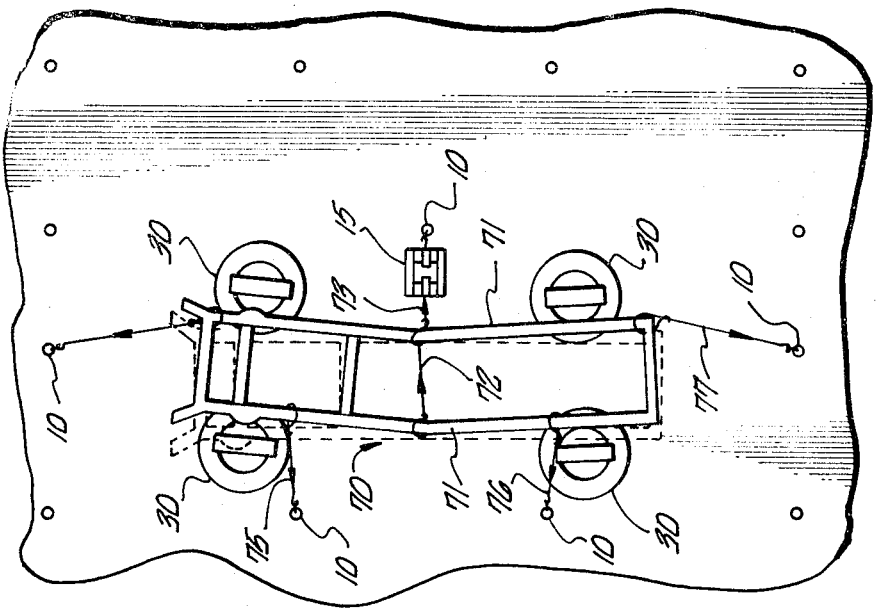
FIG. 6 is a plan view of a frame bowed at the midsection with the present invention operatively connected thereto.

FIG. 6 shows a rectangular frame 70 bowed at the midportion of the side rails 71. As illustrated, the frame 70 is located within the boundaries of the anchors 10 with a pair of chains 72 and 73 secured to the central portion of the side rails 71 with the other ends attached to the force applicator 15, which, in turn, is secured to an anchor 10. Force reactive means are provided around the periphery of the frame 70 and include a plurality of reactive chains 74, 75, 76 and 77 each secured to an anchor 10. As in the previous embodiments, the automobile is supported by a plurality of floor supported bases 30.

In the straightening operation, the force applicator 15 exerts a pulling force on the central portion of the frame 70 in a transverse direction, as indicated by the arrows on chains 72 and 73, while the reactive forces developed by the chains 75 and 76 act in the direction shown by the arrows thereon to secure the outer portions of the side rail 71 while the central portion thereof is being straightened. The reactive force developed by the chains 74 and 76 acting in the direction shown by the arrows thereon cause the frame 70 to be elongated as it is being straightened, to permit it to return to its original position, as indicated by the broken lines. As previously discussed, the tensile forces exerted by chains 74 and 77 are necessary to elongate the frame to enable the doors and other body members to be mounted properly on the frame.

FIG. 7 shows a frame 80 having one of its entire sides bent rearwardly as the result of a head-on collision. To properly correct this malformation, the rearward end of the frame 80 is secured to an anchor 10 by means of a chain 81 while the forward end of the frame 80 is connected to the force applicator 15 through a chain 82. The force applicator 15 is secured to an anchor 10 and exerts a pulling force in the direction of the arrow shown on chain 81. The reactive force exerted by the chain 82 in the direction of the arrow thereon functions to secure the rearward end of the frame 80 while its one side is pivoted forwardly until it reaches a position shown by the broken lines. The frame 80 is again supported by a plurality of the floor supported bases 30 to permit the left side of the frame to easily move forward while the entire frame is permitted to properly align itself with the corrective and reactive forces.

Although the Figures illustrate various types of damaged frames, the invention is by no means restricted to any particular type of frame or damage done thereto.

I claim:

1. An apparatus for straightening damaged automobiles comprising:
   a plurality of anchors attached to a floor and positioned peripherally about the damaged automobile;
   force applying means adapted to engage any of said anchors and is operatively applicable to the frame or damaged part of the automobile to apply a pulling force thereto;
   force reaction means adapted to engage any of said anchors and is operatively applicable to the frame or damaged part of the automobile for the resistance of the applied pulling force directed on the automobile; and
   movable floor supported means for supporting the damaged automobile to permit the automobile to properly align itself with respect to said force applying and force reaction means.

2. The invention in accordance with claim 1 wherein each of said floor supported means includes a circular support plate supported by a plurality of wheels circumferentially spaced adjacent the periphery thereof.

3. The invention in accordance with claim 2 wherein each circular support plate includes an opening formed at the center thereof.

4. The invention in accordance with claim 1 wherein said force reaction means includes flexible force transmitting means.

5. The invention in accordance with claim 4 wherein each of said flexible force transmitting means includes a length of chain having one end adapted to engage one of said anchors and the other end operatively applicable to the frame or damaged part of the automobile.

6. The invention in accordance with claim 1 wherein said force applying means includes:
   force transmitting means operatively applicable to the frame or damaged part of the automobile; and
   force applicator means attached to said force transmitting means for applying a pulling force thereto to move the frame or damaged part of the automobile to the proper straightened position.

7. The invention in accordance with claim 6 wherein said force applicator means is adapted to engage any of said anchors.

8. The invention in accordance with claim 6 wherein said force transmitting means includes a length of chain having one end adapted to engage said force applicator means and the other end operatively applicable to the frame or damaged part of the automobile.

9. The invention in accordance with claim 1 wherein said plurality of anchors are positioned along a rectangular outline on said floor with the automobile adapted to be located within the boundary of said outline.

10. The invention in accordance with claim 1 wherein said plurality of anchors are positioned in the form of a grid on said floor with the automobile adapted to be located within said grid.

* * * * *